United States Patent
Duart Álvarez Cienfuegos (10) Patent No.: US 9,399,265 B2
(45) Date of Patent: Jul. 26, 2016

(54) DEVICE AND PROCESS FOR REMOTE IGNITION IN ALUMINOTHERMIC WELDING

(71) Applicant: KLK ELECTRO MATERIALES, S.A., Gijon (Asturias) (ES)

(72) Inventor: Daniel Duart Álvarez Cienfuegos, Gijon (ES)

(73) Assignee: KLK ELECTRO MATERIALES S.L.U., Gijo (ES)

( * ) Notice: Subject to any disclaimer, the term of this patent is extended or adjusted under 35 U.S.C. 154(b) by 908 days.

(21) Appl. No.: 13/657,399

(22) Filed: Oct. 22, 2012

(65) Prior Publication Data

US 2015/0328716 A1    Nov. 19, 2015

(30) Foreign Application Priority Data

Oct. 20, 2011    (ES) .................................. 201131686

(51) Int. Cl.
*B23K 31/02*    (2006.01)
*B23K 23/00*    (2006.01)

(52) U.S. Cl.
CPC ...................................... *B23K 23/00* (2013.01)

(58) Field of Classification Search
None
See application file for complete search history.

(56) References Cited

U.S. PATENT DOCUMENTS

| | | | | | |
|---|---|---|---|---|---|
| 4,062,485 A | * | 12/1977 | Andersen | ................ | B23K 23/00 114/51 |
| 4,334,519 A | * | 6/1982 | Cieslak | .................... | A43B 7/02 126/204 |
| 4,422,124 A | * | 12/1983 | Challet | .................... | F23Q 3/002 310/339 |
| 4,879,452 A | * | 11/1989 | Kovarik | ................ | B23K 23/00 219/130.4 |
| 5,145,106 A | * | 9/1992 | Moore | .................... | B23K 23/00 228/234.3 |
| 5,279,455 A | * | 1/1994 | Fuchs | .................... | B23K 23/00 228/234.3 |
| 5,660,317 A | * | 8/1997 | Singer | .................... | B23K 23/00 164/342 |
| 5,715,886 A | * | 2/1998 | Fuchs | .................... | B23K 23/00 164/54 |
| 5,829,510 A | * | 11/1998 | Fuchs | .................... | B23K 23/00 164/335 |
| 6,776,386 B1 | * | 8/2004 | Morrissey | .............. | B23K 23/00 164/54 |

(Continued)

FOREIGN PATENT DOCUMENTS

| | | | | |
|---|---|---|---|---|
| DE | 10108597 A1 | * | 9/2002 | ............. B23K 23/00 |
| EP | 2583783 A1 | * | 4/2013 | ............. B23K 23/00 |
| ES | 2356649 A1 | | 4/2011 | |

*Primary Examiner* — Kiley Stoner
(74) *Attorney, Agent, or Firm* — Blank Rome LLP (57) ABSTRACT

It enables to use very limited energy and an easily transportable device. Comprises: a) a consumable ignition element with a resistive wire to be heated as the electric current passes through it and cause a remote ignition; b) a reusable intermediate element, provided with fitting means to be electrically connected with the ignition element; c) a portable case to house a portable power source and, d) an ignition switch that is housed in the case, with a push button to activate the power source, as well as a first indicator adapted to turn on if the power source is available and a second indicator adapted to turn on if the contact between the first tracks and the second tracks is correct.

20 Claims, 7 Drawing Sheets

(56) References Cited

U.S. PATENT DOCUMENTS

| | | | | |
|---|---|---|---|---|
| 6,789,724 B2* | 9/2004 | Cordier | B23K 23/00 | 164/108 |
| 7,946,466 B1* | 5/2011 | Lofton | B23K 23/00 | 164/54 |
| 8,324,536 B2* | 12/2012 | Viseur | B23K 23/00 | 219/270 |
| 2003/0178168 A1* | 9/2003 | Triantopoulos | B23K 23/00 | 164/54 |
| 2004/0222274 A1* | 11/2004 | Harger | B23K 23/00 | 228/234.3 |
| 2007/0017955 A1* | 1/2007 | Siracki | B23K 23/00 | 228/2.5 |
| 2007/0107869 A1* | 5/2007 | Lofton | B23K 23/00 | 164/54 |
| 2008/0156893 A1* | 7/2008 | Shim | A43B 7/02 | 237/81 |
| 2009/0173873 A1* | 7/2009 | Stidham | B22C 9/06 | 249/83 |
| 2011/0132967 A1* | 6/2011 | Lofton | B22D 19/04 | 228/33 |
| 2011/0167795 A1* | 7/2011 | Gangopadhyay | C06B 33/00 | 60/254 |
| 2012/0055979 A1* | 3/2012 | Alghusain | B23K 25/00 | 228/198 |
| 2012/0223124 A1* | 9/2012 | Lohr, Sr. | C01B 3/08 | 228/107 |
| 2013/0105560 A1* | 5/2013 | Duart Lvarez De Cienfuegos | B23K 23/00 | 228/198 |
| 2015/0219334 A1* | 8/2015 | Harger | F23Q 7/22 | 431/6 |

* cited by examiner

DEVICE AND PROCESS FOR REMOTE IGNITION IN ALUMINOTHERMIC WELDING

OBJECT OF THE INVENTION

This invention may be framed within the technological field of aluminothermic welding. In particular, the invention relates to, according to a first object, a device for remote ignition in aluminothermic welding and, according to a second object, to a process for remote ignition in aluminothermic welding.

BACKGROUND OF THE INVENTION

When it comes to making electrical connections between conducting elements using aluminothermic welding, where aluminothermic charges are used which, due to the ignition, cause the exothermic reaction which produces the necessary heat to create the welding, the traditional way to start said reaction comprises the use of what it is known as ignition powder and a spark-generating pistol.

The ignition power is a mixture of components that are similar to those making up the aluminothermic charge, but with a much smaller grain size. For this reason, the ignition powder is capable of being ignited with a much lower energy input than that needed to ignite the aluminothermic charge. In fact, the sparks generated by the pistol are enough to ignite the ignition powder. Once this has occurred, the energy that was freed during the reaction of the ignition power is enough to initiate the reaction of the aluminothermic charge itself.

In order to carry out such welding, a mold, in which the components to be joined are arranged, is used, in addition, said mold comprises a chute-crucible where the aluminothermic charge is placed. Subsequently, most of the ignition powder is poured over said aluminothermic charge to ensure that the aluminothermic reaction will be initiated simultaneously in multiple stages of the aluminothermic charge, a condition necessary for the correct propagation of that reaction.

A small amount of the ignition powder that is not poured over the aluminothermic charge is saved to be poured in an area with an easy access for the ignition pistol. Commonly, and if the mold incorporates a lid with an opening (being either a lid with a simple opening, which communicates directly with the interior of the crucible, which may not, therefore, prevent projections towards the exterior, or a lid with an adapted opening to retain the projections), said small amount of ignition powder is poured on the upper part of the mold and on the side of an opening provided on the lid. This way, it is easy to bring the pistol near that small amount of ignition powder and cause the ignition of said small amount of powder. Some of the sparks generated during the reaction of the small amount of ignition powder go through the lid opening towards the interior of the chute-crucible, where most of the ignition powder was previously poured, so that the reaction of said ignition powder will be caused which will, in turn, cause the reaction of the aluminothermic charge.

This process of chain reactions takes places almost instantaneously, in a very abrupt manner, and for this reason it is necessary that the welding operator quickly removes the hand with which the pistol is actuated. Otherwise, the particle projections that are produced during the reaction of the aluminothermic charge could cause him burns.

One solution to this disadvantage is shown in national patent application P200803232, made by KLK Electro Materiales, S.A., where a special lid is described which fulfills the function of evacuating the reaction's gasses, but retaining all of the solid particles inside the mold.

In P200803232 it is shown that one of the parts of the special lid may be used for, besides depositing the ignition powder, placing over it either the ignition pistol or the remote ignition capsule. That is, the special lid is apt to be used in a process of remote ignition with a capsule. Besides achieving increased safety, a remote ignition process is desirable when, for example, it is necessary to weld in areas with difficult access.

There are solutions currently known which contemplate the remote ignition of charges. However, they refer to very bulky devices and, therefore, difficult to transport and handle, as well as requiring high energy consumption to produce the ignition.

DESCRIPTION OF THE INVENTION

This invention solves the disadvantages previously mentioned, with the use of, according to a first aspect, a device for remote ignition in aluminothermic welding. According to a second aspect of the invention, a remote ignition process in aluminothermic welding which uses the aforementioned device, is presented.

The operation principle of the invention's device is to cause the circulation of an electric current through a resistive element to heat said resistive element up to an adequate temperature to ignite the ignition powder in contact with said resistive wire. The electric current comes from a portable power source that is connected through a cable with the necessary length to an ignition element in which the resistive element is supported. The current is sent from the power source toward the resisting element by actuating a push button placed on an ignition element which is located in a portable case, so that the operator may be separated from the area where the ignition is set to take place as much as the length of the cable allows. The ignition of the small portion of the ignition powder which is contact with the resistive element of the ignition element causes in turn the ignition of the ignition powder which is in contact with the aluminothermic charge, which in turn cases the ignition of the aluminothermic charge itself.

The ignition element is not directly connected with the cable that exits from the case, but said connection is made through an intermediate element that is conceived in a way that makes it possible to easily insert a new ignition element in said intermediate element for each ignition that is made. The ignition elements are consumable, while the case, the cable and the intermediate element are not consumable.

The remote ignition process features great reliability since, among other things, it is assured that at the moment of the ignition, there is a small quantity of ignition powder in contact with the resistive element. In addition, the remote ignition process is very easily performed since, among other things, the operator does not have to perform difficult tasks which ensure that the small amount of ignition powder remains in contact with the resistive element. As a matter of fact, the operator will be able to carelessly pour the small amount of ignition powder through the lid's slots, ensuring that this small amount of ignition powder will remain in contact with the resistive wire.

As was previously mentioned, the invention's device comprises a consumable ignition element, an intermediate element, a cable, a case and an ignition switch. Below is a detailed description of each of the aforementioned components.

The ignition element is in charge of receiving an electric current and transmitting it towards a resistive element (carried in said ignition element) to heat said resistive element through said current up to an appropriate temperature to ignite an ignition powder placed on the lid of an aluminothermic welding crucible in which the resistive element is designed to be inserted.

The ignition element comprises a substrate, two first conductive tracks attached to the substrate and separated from each other and a resistive element, with said resistive element being provided with two ends, each of them being connected to one of the first conductive tracks. The electric current that circulates through the first tracks also circulates through the resistive element, and because of that, the resistive element heats up enough to ignite the ignition powder. Usually, the resistive element turns incandescent as the current passes through, however this aspect is not essential for the functioning of the device.

Preferably, the ignition element has a substantially flat shape, and comprises a first end and a second end, where the first end is wider than the second end, and the resistive element is located on said first end. Even more preferably, the ignition element may be made from an insulating plate provided with first conductive tracks formed from a copper coating, such as a plate for a printed circuit composed of an insulating material substrate featuring a copper coating. By eliminating the copper from the central part of the plate in a longitudinal direction, the two first conductive plates are defined.

It is similarly preferable that the resistive element has the shape of a prismatic or cylindrical wire. The ignition element may incorporate a through hole in the placement area of the resistive element to allow passage of the sparks generated during the ignition of the small amount of ignition powder to the chute-crucible.

The resistive element likewise comprises two ends, each of which is connected (preferably through welding) to one of the first tracks of the ignition element, to allow passage of the current towards said resistive element.

The composition of the resistive element (preferably Ni—Cr alloy), as well as its reduced size in length and thickness is suitable to enable it to reach the adequate temperature for the ignition using a reduced energy input. Specifically, in a preferred manner, commercial batteries may be used, namely a 3V power source is enough (for example, two commercial batteries of 1.5V connected in line).

Another component of the invention's device, as mentioned above, is an intermediate element to electrically connect the power source and the ignition element, and designed to be kept outside the mold-crucible and, thus be reusable.

The intermediate element comprises a first body, over which a first cable gland is placed, designed to house a first end of a cable connected to the power source through its second end. Also attached to said body are two second conductive tracks, preferably placed on a plate, with each of said second conductive plates being adapted to be connected to one of the cable's wires. The intermediate element additionally comprises a fitting element designed to provide the connection between said intermediate element and the ignition element, in such a way that each of the second conductive tracks is in contact with its corresponding first conductive track. Preferably, each of the second conductive tracks is welded to one of the cable's wires.

Preferably, the fitting element is materialized in a clamp which comprises a pressure element rotationally linked to the body, and designed to press the first tracks against the second tracks, as well as comprising a spring to provide strength to the pressure element.

The invention's device further incorporates a case provided with compartments to house the power source and the second end of the cable, as well as to house the ignition switch. The case comprises retention and insulation elements appropriate to guarantee the necessary sealed electric connections.

The ignition switch comprises a button and two indicator lights (a first and a second indicator). Preferably, the indicators are one first LED diode and a second LED diode. The first LED is adapted to turn on when the power source is available (the batteries are not drained), while the second LED is adapted to turn on when the electric contact between the intermediate element and the ignition element is correct. In a preferable way, the first LED turns on in green and the second LED turns on in orange.

The use of the invention's device allows for the remote ignition of the aluminothermic charges using ignition powder, with an extraordinarily reduced energy consumption and control of the status of availability of the power source.

The invention's device is advantageously adapted to be used in the remote ignition of an aluminothermic welding in which a chute-crucible is used provided with a lid that incorporates an opening to support the spark-generating pistol over it once a small amount of ignition powder has been introduced in this opening, such as for example, the lid that is described in patent P200803232. This way, when the ignition is to be made, the invention's device may be used for a remote ignition, with the assurance that, in the event of the device's failure, there is always the possibility of performing a non-remote ignition using the spark pistol, with the appropriate safety measures. Said ambivalence allows keeping the production of welding while the ignition device is repaired or substituted. On the other hand, experiments performed show that the use of a lid such as the one previously mentioned simplifies the tasks of the remote ignition, as well as increasing the reliability of said ignition, since it ensures that a small amount of ignition powder will generate the ignition and that said amount of ignition powder may be poured carelessly.

As previously stated, the invention's device is especially suited to be used in the remote ignition of aluminothermic welding in crucibles that feature a lid according to what is described in the application P200803232.

Said lid comprises a slot on its upper part, said slot being accessible from the outside and is used to pour (in a careless manner if wished) the small part of the ignition powder in it. In the event of ignition with the ignition pistol, the slot is designed for the gun to be applied over it. The lower part of the slot points to the area where the resistive element is placed once the ignition element has been introduced in a housing area provided on the lid. This way, it is guaranteed that the ignition powder is in contact with the resistive element. In order to facilitate the insertion of the ignition element into its housing, the lid is retractable, through an articulation placed on the end of the lid opposite to the housing, said articulation being provided with a handle that facilitates the retraction. The slot may have the shape of a funnel, as described in application P201131538, in which case, the narrowing of the funnel coincides with the lower part of said funnel, pointing towards the housing designed to house the resistive element, thus ensuring that the walls of the slot channel the small part of the ignition powder so that it remains in contact with said resistive element.

Described below is the process for the execution of the ignition, which comprises the following steps:

Check the availability of the power source, actuating the push button, with the case, the cable and the intermediate element connected to each other, but with the ignition element not connected to the intermediate element. If the first indicator turns on, the status of the power source is correct.

Afterwards, if the power source is available, connect the second end of the ignition element to the fitting element of the intermediate element. If the second indicator turns on, the contact between the first conductive tracks and the second conductive tracks is correct.

Afterwards, if the contact between the first conductive tracks and the second conductive tracks is correct, once the mold and the elements necessary for the welding have been prepared, and the lid has been closed, introduce the first end of the ignition element into the lid's opening and apply the ignition powder.

Move away from the mold to an adequate distance carrying the case, actuate the push button and keep said push button actuated until the reaction takes place.

Optionally, the process comprises, once the reaction has taken place, separating the intermediate element from the ignition element, as well as proceeding to remove the ignition element and opening the mold to remove the welded elements, as is already known.

DESCRIPTION OF THE DRAWINGS

To complement the description being made and in order to help better understand the characteristics of the invention, according to a preferred practical embodiment thereof, a set of drawings is attached as an integral part of said description, wherein the following is shown as way of illustration but not limited to:

FIG. 5.—Shows a perspective view of the switch when powered on.

PREFERRED EMBODIMENT OF THE INVENTION

Figure 6:
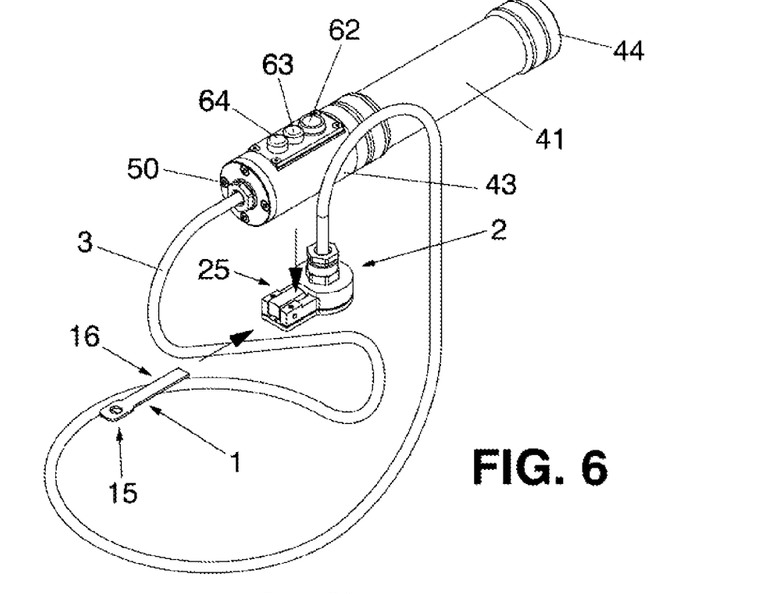
FIG. 6.—Shows a perspective view of the invention's device, with the ignition element in an external position to the intermediate element.

As is shown in FIG. 6, the invention's device comprises a consumable ignition element (1), an intermediate element (2) that is reusable, a two-wire cable (3), a case (4) and an ignition switch (6).

Figure 1:
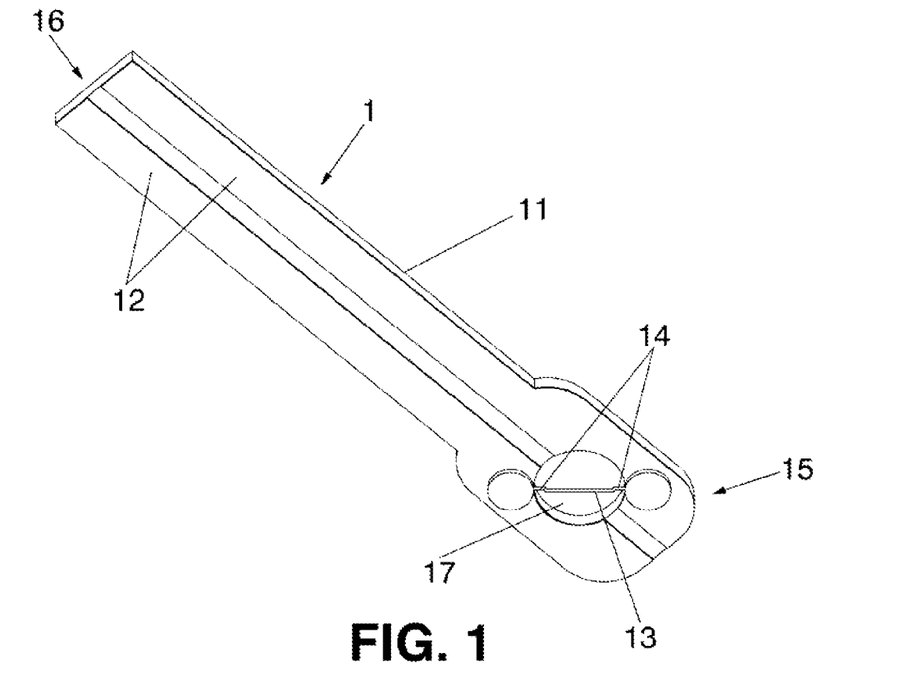
FIG. 1.—Shows a perspective view of the ignition element.
Figure 7:
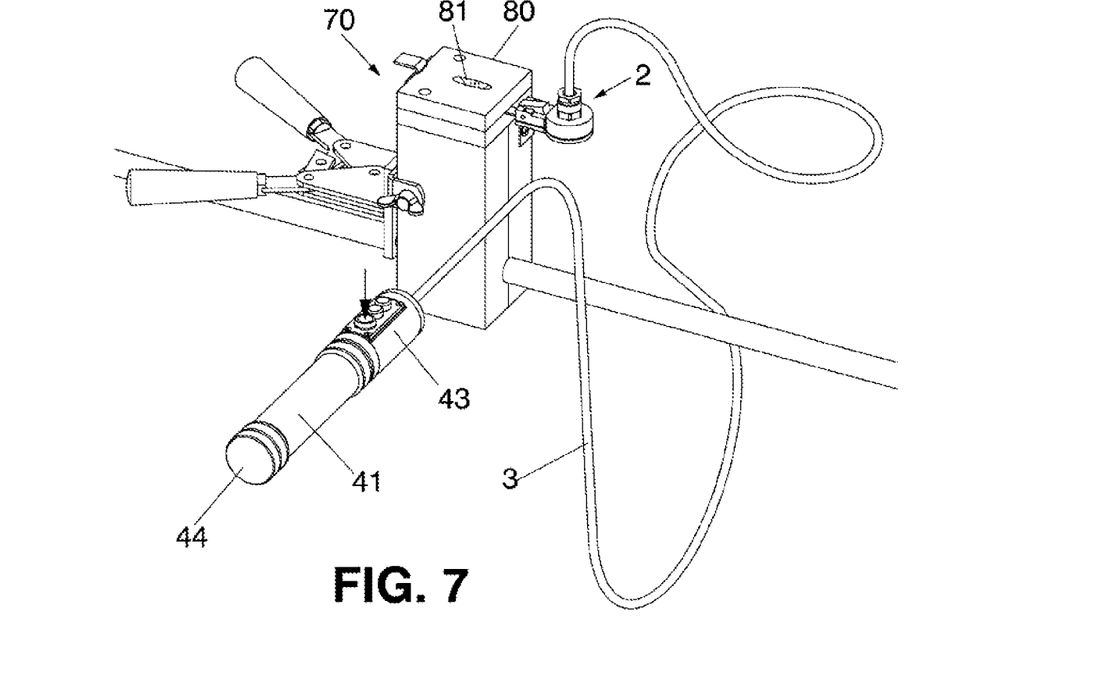
FIG. 7.—Shows a view of the invention's device with the ignition element connected to the intermediate element and inserted in the opening in the lid of the mold-crucible.

FIG. 1 shows that the ignition element (1) comprises a substrate (11), two first conductive tracks (12) attached to the substrate (11) and separated between them, and a resistive wire (13) provided with two ends (14) each of which is connected to one of the first conductive tracks (12), where the resistive wire (13) is capable of heating due to the effect of an electric current that circulates through said resistive wire (13) and through the first conductive tracks (12) to, (see FIG. 7) ignite the ignition powder placed on the lid (80) of a mold-crucible (70) of an aluminothermic welding, with said lid (80) incorporating an slot (81) that channels the ignition powder poured through said opening (81) so that it remains in contact with resistive wire (13) that incorporates the ignition element (1).

The ignition element (1) has a flat shape and it comprises a first end (15) and a second end (16), where the first end (15) is wider than the second end (16), as well as the resistive wire (13) is placed in said first end (15). The ignition element (1) incorporates a through bore (17) in the placement area of the resistive wire (13) to allow passage of the sparks generated during the ignition towards the mold-crucible (70).

The resistive wire (13) also comprises two ends (14) each of which is connected through a welding to one of the first conductive tracks (12) to allow passage of the current towards said resistive wire (13).

Figure 2:
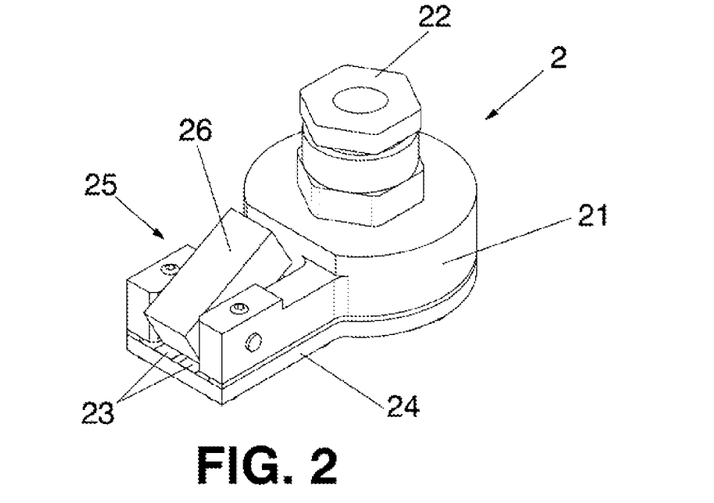
FIG. 2.—Shows a perspective view of the intermediate element.

According to what was shown in FIG. 2, the intermediate element (2) is designed to be kept outside of the lid (80) of the mold-crucible (70) and, therefore, to be reusable. Said intermediate element (2) comprises a first body (21), over which a first cable gland (22) is located, designed to house an end of the cable (3). Attached to said first body (21) are also the second conductive tracks (23) arranged on a plate (24), with each of said second conductive plates (23) being adapted to be connected to one of the wires of the cable (3). The intermediate element (2) further comprises a clamp (25) by way of a fitting element (25), with said clamp (25) being designed to provide the connection between said intermediate element (2) and the ignition element (1), in such a way that each second conductive track (23) is in contact with its respective first conductive track (12).

Figure 3:
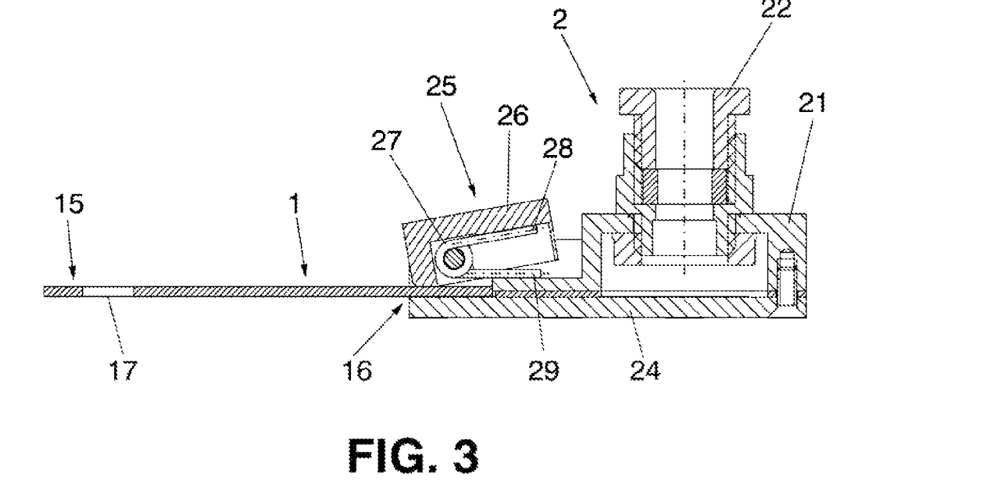
FIG. 3.—Shows a sectional view of the intermediate element connected to the ignition element.

As may be seen in FIG. 3, the clamp (25) comprises a pressure element (26) rotationally linked to the first body (21) and designed to press the first conductive tracks (12) against the second conductive tracks (23), as well as comprising a spring (27) to provide strength to the pressure element (26). The spring (27) is a torsion spring (27) which comprises two pins (28, 29) the first pin (28) which acts upon the pressure element (26) and a second pin (29) which is attached to the first body (21).

To insert the ignition element (1) into the clamp (25) it is just necessary to put some strength on one end of the pressure element (26), so that the pressure element (26) rotates and the spring (27) is compressed, with an opening between the pressure element (26) and the plate (24) appearing as a consequence, with said opening being sufficient to introduce the second end (16) of the ignition element (1).

The cable (3) is an extra flexible cable (3) which, on one end, is attached, as explained above, to the second conductive tracks (23) and on the other end it is attached, as may be seen below, to the case (4).

Figure 4:
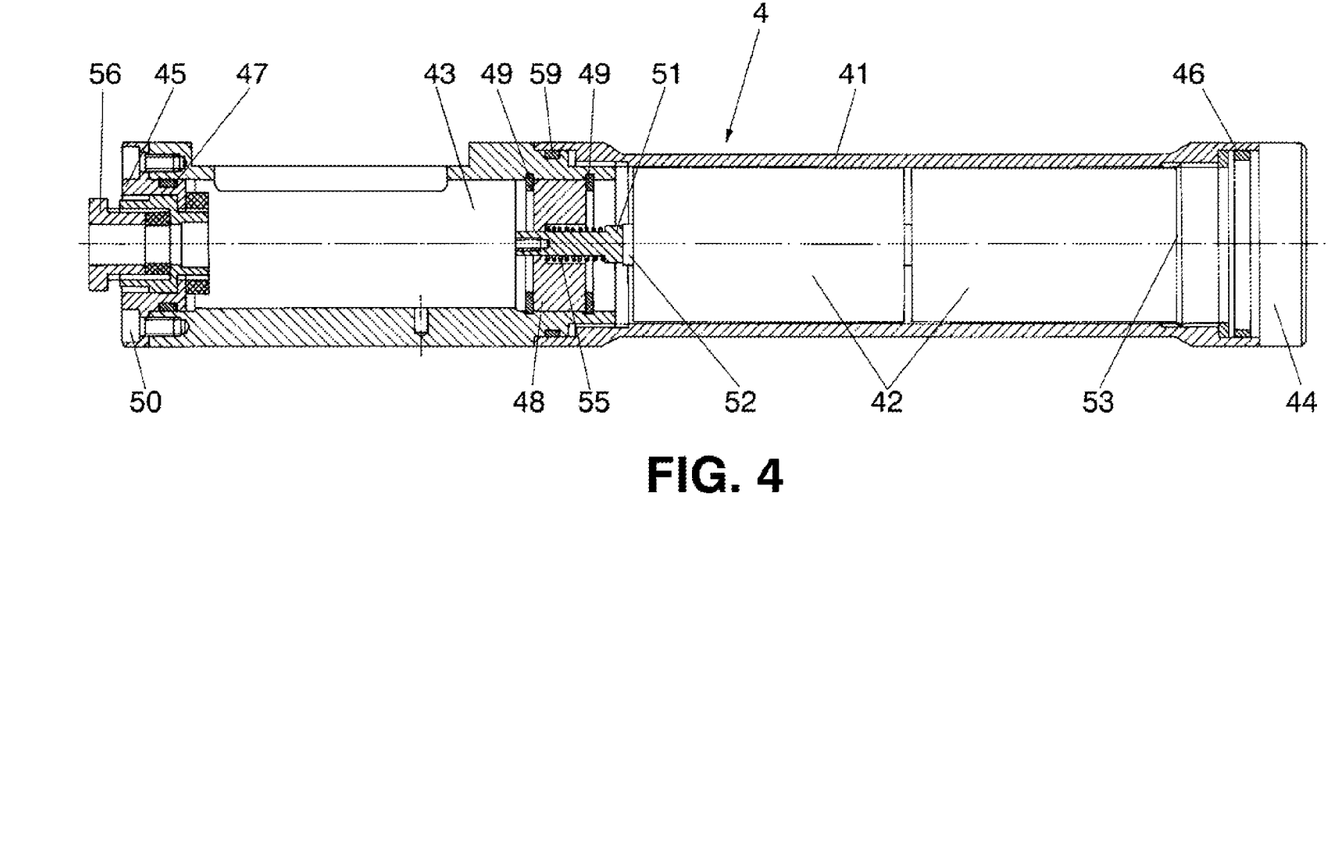
FIG. 4.—Shows a sectional magnified view of the case.

Shown in FIG. 4 is the case (4). The case (4) comprises a central body (41) adapted to house some batteries (42) by way of a portable power source (42), as well as comprising an elongation body (43), adjacent to the central body (41) and adapted to house the ignition switch (6). The central body (41) is a compartment with a tubular shape with an interior diameter slightly greater than that of the exterior diameter of the batteries (42). In a first end of the central body (41) a threaded joint is made with a rear lid (44), with said joint incorporating a first seal joint (46) while in a second end of the central body (41) a threaded joint is made with the elongation body (43), with said joint incorporating a second seal joint (59).

The elongation body (43) is also adapted to house an insulating support (48) in a first end, whose position is secured with elastic rings (49). On the opposite end a joint is made with a front lid (45) using some first screws (50), with said joint incorporating a third seal joint (47).

The insulating support (48) is used to electrically insulate a copper stem (51) and the elongation body (43), which is necessary, since the stem (51) makes contact with a first pole (52) of the batteries (42), while the elongation body (43) and the remainder of the metal pieces that form the case (4), i.e. the central body (41), the elongation body (43) and the rear lid (44), are in electric contact with a second pole (53) of the batteries (42) opposite to the first pole (52).

The rear lid (44) is used to ensure that the batteries (42) remain inside the central body (41), and to also make electric contact with the second pole (53) of the batteries (42). The rear lid (44) is also in electric contact with the central body (41) and with the elongation body (43), which connects to the terminal corresponding to the ignition switch (6).

The stem (51) may slide through an opening of the insulating support (48), but between them there is a spring (55) which strongly pushes the stem (51) against the first pole (52) of the batteries (42). This way, a good electric contact is achieved between one of the ends of the stem (51) and the first pole (52), and also between the rear lid (44) and the second pole (53). The opposite end of the stem (51) is connected to the terminal corresponding to the ignition switch (6).

The front lid (45) is used to sustain a second cable gland (56) which is the element in which the cable (3) is introduced forming two wires. Each of the two wires that form the cable (3) will be connected to the terminal corresponding to the ignition switch (6). The front lid (45) connects to the elongation body (43) using some first screws (50). A third seal joint (47) is provided in this joint.

Figure 5:
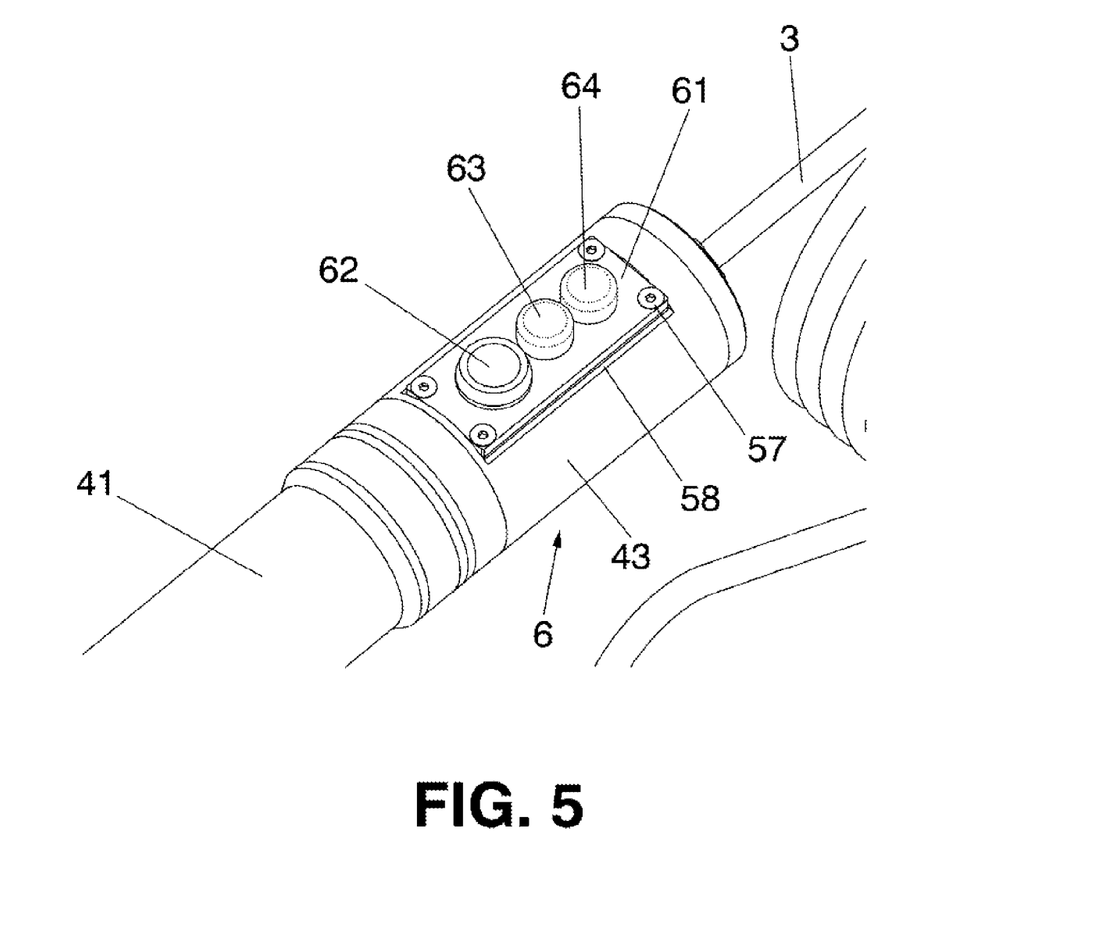
Figure 8:
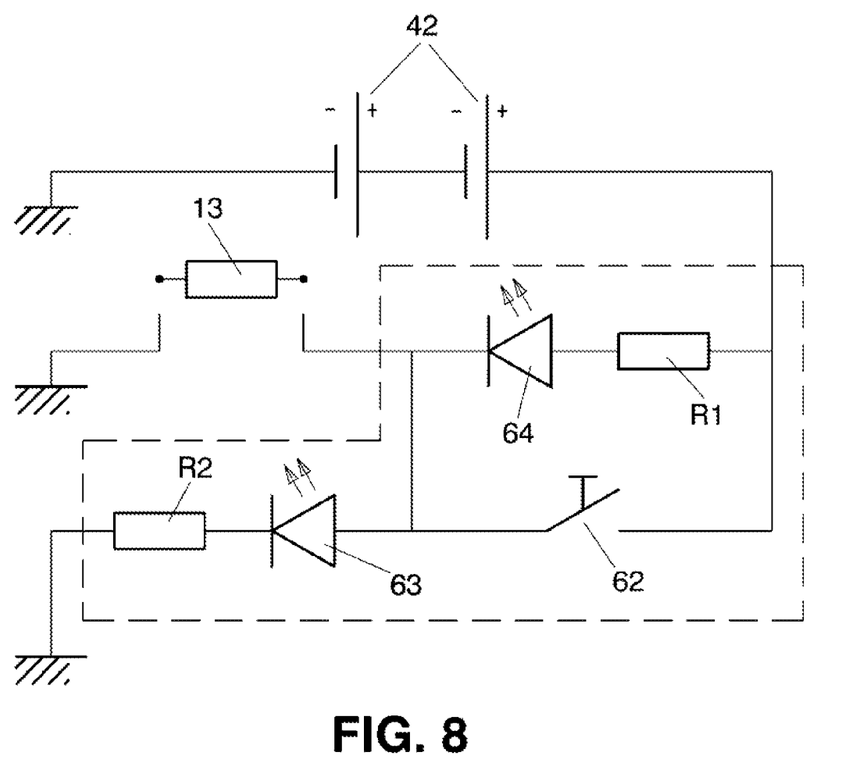
FIG. 8.—Shows an outline of the electric circuit of the ignition switch.

As seen in FIG. 5, the ignition switch (6) comprises a push button (62) and comprises a first indicator (63) materialized in a first LED diode (63), as well as a second indicator (64) materialized in a second LED diode (64). It additionally comprises a controlled electronic circuit, whose outline has been represented in FIG. 8, to enable the performance of the following operations:

1. Without having inserted the ignition element (1) into the clamp (25), when the push button (62) is kept pressed, the first LED diode (63) emits a light signal so long as the batteries (42) are not drained.
2. Once the ignition element (1) has been inserted into the clamp (25), the second LED diode (64) emits a light signal so long as the electric contact between the first conductive tracks (12) and the second conductive tracks (23) is correct.
3. Once the ignition element (1) has been inserted into the clamp (25), when the push button (62) is kept pressed, electric current is supplied to the ignition element (1).

From the paragraph above, the simplicity of the device's operation may be discerned, since by actuating a single push button (62) several operations, depending on the situation, may be performed.

The ignition switch (6) and, consequently, the push button (62) are found in the case (4), therefore the user may move away from the area where the ignition takes place by as much as the length of the cable (3) allows.

The switch incorporates a fourth seal joint (58) at its connection with the case (4). Additionally, the push button (62) incorporates a fifth seal joint (not shown) and the sight glasses incorporate some sixth seal joints (not shown).

The second cable gland (56) and the seal joints (46, 47, 58, 59) are elements that seal the interior of the case (4), so that a certain degree of electric protection is attained.

The essential elements that are featured in the ignition switch (6), i.e., the push button (62) and the two LED diodes (63, 64), provided with lenses (not shown), are assembled onto a plate (61) attached with some second screws (57) to the case (4). It is done in a way that the elements that are meant to be accessible or seen by the user, i.e., the push button (62) and the diodes' lenses, are on the outside of the case (4), and the remaining elements are on the inside of the case (4). This operation is performed using a compartment in the elongation body (43). The LED diodes (63, 64) are not directly connected to the plate (61), but they are introduced into sight glasses (not shown) for LED attached to the plate (61).

Shown in FIG. 8 is an outline of the electronic circuit, including the resistive wire (13) and the two batteries (42). The resistances $R_1$ and $R_2$ are elements necessary to protect the LED diodes (63, 64) from intensity surges.

Figure 9:
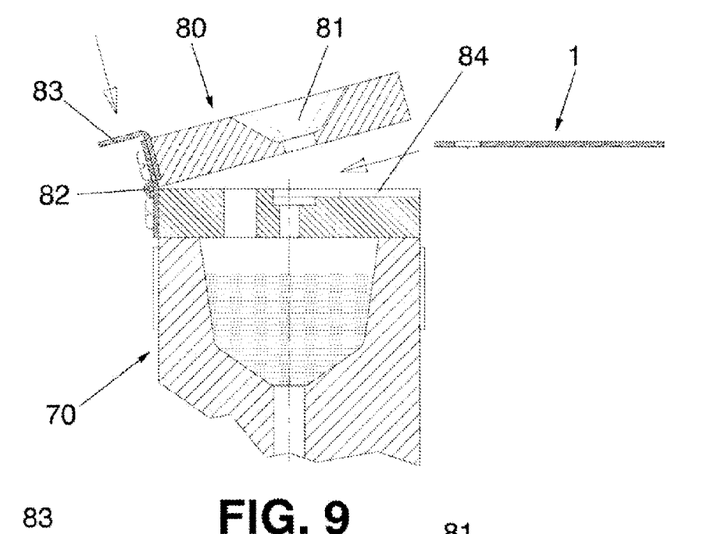
FIG. 9.—Shows a sectional view of the crucible's lid before the insertion of the ignition element.
Figure 10:
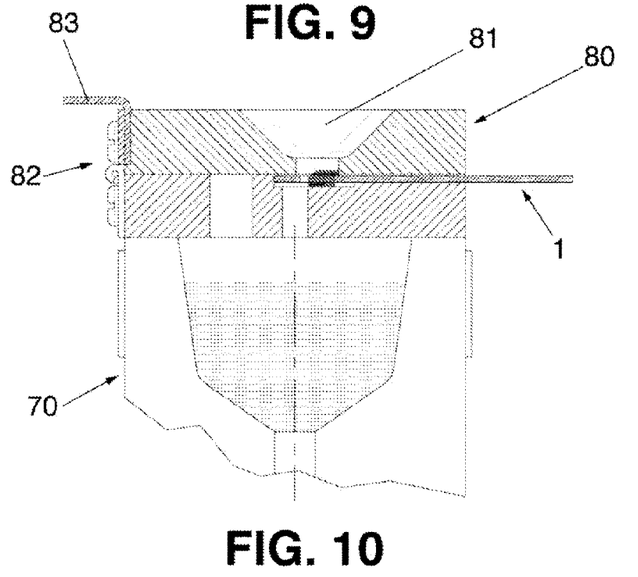
FIG. 10.—Shows a sectional view of the crucible's lid with the ignition element having been inserted.

As shown on FIGS. 9 and 10, the invention's device is preferably used for the remote ignition of an aluminothermic welding using a mold-crucible (70) provided with a lid (80) that comprises a slot (81) with a funnel shape on its upper part to place (carelessly if wanted) the ignition powder before or after inserting the ignition element (1) in a housing (84) inside the lid (80). The lid (80) is retractable through an articulation (82) with a handle (83), to facilitate the insertion of the ignition element (1) inside said housing (84). First, the ignition element (1) is introduced in the housing (84), subsequently the ignition power is poured into the slot (81), therefore the ignition powder remains in contact with the resistive wire (13) to be subsequently ignited.

The invention claimed is:

1. A device for remote ignition in aluminothermic welding, comprising:
   a consumable ignition element comprising:
      a substrate,
      two first conductive tracks separated and placed over the substrate, and
      a resistive element, which is configured to be inserted in a mold-crucible of aluminothermic welding, said mold crucible comprising a lid with at least one slot for housing an ignition powder, wherein the resistive element is provided with two ends, each end being connected to one of the first conductive tracks, said resistive element being, when inserted in the mold-crucible, in contact with the ignition powder housed in the lid, the resistive element further being capable of being heated, as an electric current passes through it, to an adequate temperature for igniting the ignition powder, wherein the lid has upper and lower parts hinged to each other, the at least one slot being located on the upper part, and the housing being located at the lower part;
   wherein the ignition element has a flat shape, and further comprises:
      a first end whereon the resistive element is located; and
      a second end, where the first end is wider than the second end, so as to be retained in the housing between the upper part and the lower part;
   a reusable intermediate element comprising:
      a first body,
      a first cable gland located over the first body, said cable gland designed to house a first end of a two-wire cable connected by a second end to a portable power source,
      two second conductive tracks attached to said first body, each second conductive track being adapted to be connected to one of the wires of the cable, and
      a fitting element designed to provide a connection with the ignition element, so that each of the second conductive tracks is in contact with its corresponding first conductive track;

a portable case comprising:
  a central body for housing the power source; and
  an elongation body; and
an ignition switch housed in the elongation body and comprising:
  a push button for activating the power source,
  a first indicator adapted to turn on if the power source is available, and
  a second indicator adapted to turn on if the contact between the first tracks and the second tracks is correct.

2. The device of claim 1, wherein the substrate is an insulating plate provided with first conductive tracks formed by a copper coating.

3. The device of claim 1, wherein the resistive element is a resistive wire having a prismatic or cylindrical shape.

4. The device of claim 1, wherein the ignition element incorporates a through bore in an area in which the resistive element is placed, for allowing sparks generated during the ignition passing towards the mold-crucible.

5. The device of claim 1, wherein the intermediate element additionally comprises a plate to a one single side of which the second conductive tracks are attached.

6. The device of claim 1, wherein the fitting element is a clamp comprising:
  a pressure element rotationally linked to the first body, and designed to press the first conductive tracks against the second conductive tracks, and
  a spring for providing pressure strength to the pressure element.

7. The device of claim 1, wherein the first indicator is a first LED diode and the second indicator is a second LED diode.

8. The device of claim 1, wherein the power source comprises at least one battery, and the device further incorporates an insulating support placed at an end of the elongation body for electrically insulating a stem designed to make contact with one of the poles of the at least one battery.

9. A device for remote ignition in aluminothermic welding, comprising:
  a consumable ignition element comprising:
    a substrate,
    two first conductive tracks separated and placed over the substrate, and
    a resistive element, which is configured to be inserted in a mold-crucible of aluminothermic welding, said mold crucible comprising a lid with at least one slot for housing an ignition powder, wherein the resistive element is provided with two ends, each end being connected to one of the first conductive tracks, said resistive element being, when inserted in the mold-crucible, in contact with the ignition powder housed in the lid, the resistive element further being capable of being heated, as an electric current passes through it, to an adequate temperature for igniting the ignition powder;
  a reusable intermediate element comprising:
    a first body,
    a first cable gland located over the first body, said cable gland designed to house a first end of a two-wire cable connected by a second end to a portable power source,
    two second conductive tracks attached to said first body, each second conductive track being adapted to be connected to one of the wires of the cable,
    a fitting element designed to provide a connection with the ignition element, so that each of the second conductive tracks is in contact with its corresponding first conductive track; and
    a plate to a one single side of which the second conductive tracks are attached;
  a portable case comprising:
    a central body for housing the power source; and
    an elongation body; and
  an ignition switch housed in the elongation body and comprising:
    a push button for activating the power source,
    a first indicator adapted to turn on if the power source is available, and
    a second indicator adapted to turn on if the contact between the first tracks and the second tracks is correct.

10. The device of claim 9, wherein the substrate is an insulating plate provided with first conductive tracks formed by a copper coating.

11. The device of claim 9, wherein the resistive element is a resistive wire having a prismatic or cylindrical shape.

12. The device of claim 9, wherein the ignition element incorporates a through bore in an area in which the resistive element is placed, for allowing sparks generated during the ignition passing towards the mold-crucible.

13. A device for remote ignition in aluminothermic welding, comprising:
  a consumable ignition element comprising:
    a substrate,
    two first conductive tracks separated and placed over the substrate, and
    a resistive element, which is configured to be inserted in a mold-crucible of aluminothermic welding, said mold crucible comprising a lid with at least one slot for housing an ignition powder, wherein the resistive element is provided with two ends, each end being connected to one of the first conductive tracks, said resistive element being, when inserted in the mold-crucible, in contact with the ignition powder housed in the lid, the resistive element further being capable of being heated, as an electric current passes through it, to an adequate temperature for igniting the ignition powder;
  a reusable intermediate element comprising:
    a first body,
    a first cable gland located over the first body, said cable gland designed to house a first end of a two-wire cable connected by a second end to a portable power source,
    two second conductive tracks attached to said first body, each second conductive track being adapted to be connected to one of the wires of the cable, and
    a fitting element designed to provide a connection with the ignition element, so that each of the second conductive tracks is in contact with its corresponding first conductive track, where the fitting element is a clamp comprising:
      a pressure element rotationally linked to the first body, and designed to press the first conductive tracks against the second conductive tracks; and
      a spring for providing pressure strength to the pressure element;
  a portable case comprising:
    a central body for housing the power source; and
    an elongation body; and
  an ignition switch housed in the elongation body and comprising:
    a push button for activating the power source,
    a first indicator adapted to turn on if the power source is available, and a second indicator adapted to turn on if the contact between the first tracks and the second tracks is correct.

14. The device of claim 13, wherein the substrate is an insulating plate provided with first conductive tracks formed by a copper coating.

15. The device of claim 13, wherein the resistive element is a resistive wire having a prismatic or cylindrical shape.

16. The device of claim 13, wherein the ignition element incorporates a through bore in an area in which the resistive element is placed, for allowing sparks generated during the ignition passing towards the mold-crucible.

17. A device for remote ignition in aluminothermic welding, comprising:
   a consumable ignition element comprising:
      a substrate,
      two first conductive tracks separated and placed over the substrate, and
      a resistive element, which is configured to be inserted in a mold-crucible of aluminothermic welding, said mold crucible comprising a lid with at least one slot for housing an ignition powder, wherein the resistive element is provided with two ends, each end being connected to one of the first conductive tracks, said resistive element being, when inserted in the mold-crucible, in contact with the ignition powder housed in the lid, the resistive element further being capable of being heated, as an electric current passes through it, to an adequate temperature for igniting the ignition powder;
   a reusable intermediate element comprising:
      a first body,
      a first cable gland located over the first body, said cable gland designed to house a first end of a two-wire cable connected by a second end to a portable power source including at least one battery,
      two second conductive tracks attached to said first body, each second conductive track being adapted to be connected to one of the wires of the cable, and
      a fitting element designed to provide a connection with the ignition element, so that each of the second conductive tracks is in contact with its corresponding first conductive track;
   a portable case comprising:
      a central body for housing the power source; and
      an elongation body, where an insulating support is placed at an end of the elongation body for electrically insulating a stem designed to make contact with one of the poles of the at least one battery; and
   an ignition switch housed in the elongation body and comprising:
      a push button for activating the power source,
      a first indicator adapted to turn on if the power source is available, and
      a second indicator adapted to turn on if the contact between the first tracks and the second tracks is correct.

18. The device of claim 17, wherein the substrate is an insulating plate provided with first conductive tracks formed by a copper coating.

19. The device of claim 17, wherein the resistive element is a resistive wire having a prismatic or cylindrical shape.

20. The device of claim 17, wherein the ignition element incorporates a through bore in an area in which the resistive element is placed, for allowing sparks generated during the ignition passing towards the mold-crucible.

\* \* \* \* \*